(12) United States Patent
Mak et al.

(10) Patent No.: US 11,568,191 B2
(45) Date of Patent: Jan. 31, 2023

(54) RADIO FREQUENCY COMMUNICATION DEVICE AND A METHOD FOR USING THEREOF

(71) Applicant: Hong Kong R&D Centre for Logistics and Supply Chain Management Enabling Technologies Limited, Pok Fu Lam (HK)

(72) Inventors: Chi Lun Mak, Pok Fu Lam (HK); Kwong Chu, Pok Fu Lam (HK)

(73) Assignee: Hong Kong R&D Centre for Logistics & Supply Chain Management Enabling Technologies Limited, Pok Fu Lam (HK)

( * ) Notice: Subject to any disclaimer, the term of this patent is extended or adjusted under 35 U.S.C. 154(b) by 201 days.

(21) Appl. No.: 16/331,667

(22) PCT Filed: Sep. 9, 2016

(86) PCT No.: PCT/CN2016/098542
§ 371 (c)(1),
(2) Date: Mar. 8, 2019

(87) PCT Pub. No.: WO2018/045550
PCT Pub. Date: Mar. 15, 2018

(65) Prior Publication Data
US 2019/0244066 A1    Aug. 8, 2019

(51) Int. Cl.
*G06K 19/077*   (2006.01)
*G06K 7/10*     (2006.01)
*G06K 19/02*    (2006.01)

(52) U.S. Cl.
CPC ....... *G06K 19/027* (2013.01); *G06K 7/10376* (2013.01); *G06K 7/10445* (2013.01); *G06K 19/0776* (2013.01); *G06K 19/07783* (2013.01); *G06K 19/07786* (2013.01)

(58) Field of Classification Search
CPC .......... G06K 19/07749; G06K 19/027; G06K 19/0723; G06K 7/10445; G06K 19/0776; G06K 19/07786; G06K 19/07783; G06K 7/10376
See application file for complete search history.

(56) References Cited

U.S. PATENT DOCUMENTS 5,838,253 A * 11/1998 Wurz ................. G06K 19/0702
                                                    340/10.42
6,100,804 A *  8/2000 Brady .............. G06K 19/07749
                                                      257/678
7,154,449 B2* 12/2006 Liu .................. G06K 19/07749
                                                      343/867
(Continued)

FOREIGN PATENT DOCUMENTS

FR      2919409 A1 *  1/2009  ......... G06K 7/10178
JP    2005033461 A *  2/2005
(Continued)

*Primary Examiner* — Daniel I Walsh
(74) *Attorney, Agent, or Firm* — Renner, Kenner, Greive, Bobak, Taylor & Weber

(57) ABSTRACT

A radio frequency communication device includes a conductive loop electrically connected to an integrated circuit arrangement and a pair of opposing elongated conductors extending away from the conductive loop.

14 Claims, 12 Drawing Sheets

(56) References Cited

U.S. PATENT DOCUMENTS

| | | | | |
|---|---|---|---|---|
| 7,259,678 B2* | 8/2007 | Brown | G06K 19/07728 | 340/572.7 |
| 7,277,017 B2* | 10/2007 | Baba | G06K 19/073 | 235/492 |
| 7,286,055 B2* | 10/2007 | Girvin | G06K 19/07381 | 340/572.3 |
| 7,323,977 B2* | 1/2008 | Kodukula | G06K 19/0724 | 340/10.1 |
| 7,342,498 B2* | 3/2008 | Baba | G06K 19/07749 | 340/572.5 |
| 7,505,001 B2* | 3/2009 | Deavours | H01Q 5/35 | 343/700 MS |
| 7,540,428 B2* | 6/2009 | Baba | G06K 19/07758 | 235/492 |
| 7,557,757 B2* | 7/2009 | Deavours | H01Q 5/35 | 343/860 |
| 7,570,225 B2* | 8/2009 | Kai | G06K 19/07749 | 343/741 |
| 7,696,947 B2* | 4/2010 | Gallschuetz | G06K 19/07749 | 340/572.1 |
| 7,714,794 B2* | 5/2010 | Tavassoli Hozouri | G06K 19/07749 | 343/795 |
| 7,901,533 B2* | 3/2011 | Steidinger | G06K 7/10178 | 156/247 |
| 8,058,560 B2* | 11/2011 | Lo | H05K 1/028 | 174/250 |
| 8,493,215 B2* | 7/2013 | Tada | G06K 19/07749 | 340/572.7 |
| 8,717,244 B2* | 5/2014 | Joyce, Jr. | H01Q 1/2225 | 343/795 |
| 9,246,215 B1* | 1/2016 | Lee | H01Q 9/42 | |
| 9,843,102 B2* | 12/2017 | Lai | H01Q 19/005 | |
| 10,020,568 B2* | 7/2018 | Den | G06K 19/07722 | |
| 10,062,025 B2* | 8/2018 | Roesner | G06K 19/0723 | |
| 10,373,045 B2* | 8/2019 | Forster | H01Q 9/16 | |
| 10,389,027 B2* | 8/2019 | Rokhsaz | G06K 7/10336 | |
| 10,438,110 B2* | 10/2019 | Kapp | G06K 19/072 | |
| 10,657,432 B1* | 5/2020 | Soriano | G06K 19/07773 | |
| 11,055,595 B2* | 7/2021 | Forster | G06K 19/07749 | |
| 11,120,324 B2* | 9/2021 | Forster | G06K 19/07792 | |
| 11,122,694 B2* | 9/2021 | Min | H01Q 21/28 | |
| 11,176,436 B2* | 11/2021 | Mak | G06K 19/07773 | |
| 2004/0075616 A1* | 4/2004 | Endo | G06K 19/0726 | 343/895 |
| 2005/0040994 A1* | 2/2005 | Mazoki | H01Q 9/16 | 343/809 |
| 2005/0077353 A1* | 4/2005 | Oishi | G06K 19/07786 | 235/385 |
| 2006/0032926 A1* | 2/2006 | Baba | G06K 19/07749 | 235/492 |
| 2006/0043199 A1* | 3/2006 | Baba | G06K 19/07749 | 235/492 |
| 2006/0044769 A1* | 3/2006 | Forster | G06K 19/07749 | 361/760 |
| 2006/0054710 A1* | 3/2006 | Forster | H01Q 1/22 | 235/492 |
| 2006/0158380 A1* | 7/2006 | Son | H01Q 1/2225 | 343/748 |
| 2006/0187053 A1* | 8/2006 | Koele | G06K 19/07749 | 340/572.7 |
| 2006/0208095 A1* | 9/2006 | Yamagajo | G06K 19/07372 | 235/492 |
| 2006/0208900 A1* | 9/2006 | Tavassoli Hozouri | H01Q 1/248 | 340/572.7 |
| 2006/0208955 A1* | 9/2006 | Kai | H01Q 1/22 | 343/795 |
| 2006/0220871 A1* | 10/2006 | Baba | G06K 19/0739 | 340/572.1 |
| 2007/0046475 A1* | 3/2007 | Carrender | G08B 13/24 | 340/572.7 |
| 2007/0069020 A1* | 3/2007 | Baraldi | G06K 19/07749 | 235/435 |
| 2007/0125867 A1* | 6/2007 | Oberle | G06K 19/07786 | 235/492 |
| 2007/0164867 A1* | 7/2007 | Kawai | G06K 19/07783 | 340/572.7 |
| 2007/0182154 A1* | 8/2007 | Hoeppner | B42D 25/46 | 283/72 |
| 2007/0200705 A1* | 8/2007 | Yamagajo | G06K 19/07786 | 340/572.7 |
| 2007/0222602 A1* | 9/2007 | Luo | G06K 7/10178 | 340/572.7 |
| 2007/0240304 A1* | 10/2007 | Eisenhardt | G06K 19/07718 | 29/825 |
| 2008/0036673 A1* | 2/2008 | Yamagajo | G06K 19/07749 | 343/793 |
| 2008/0088448 A1* | 4/2008 | Steidinger | H01Q 1/2225 | 340/572.1 |
| 2008/0122631 A1* | 5/2008 | Kodukula | G06K 19/0723 | 340/572.8 |
| 2008/0180255 A1* | 7/2008 | Isabell | G06K 19/07749 | 156/60 |
| 2008/0246614 A1* | 10/2008 | Paananen | H01Q 1/20 | 340/572.7 |
| 2008/0316020 A1* | 12/2008 | Robertson | A61B 1/00016 | 340/539.12 |
| 2009/0045964 A1* | 2/2009 | Takeda | G06K 19/07749 | 340/572.9 |
| 2009/0079542 A1* | 3/2009 | Heinl | G06K 19/07771 | 235/487 |
| 2009/0096696 A1* | 4/2009 | Joyce, Jr. | H01Q 1/38 | 343/793 |
| 2009/0115615 A1* | 5/2009 | Bleckmann | G08B 13/2434 | 340/572.8 |
| 2010/0032487 A1* | 2/2010 | Bohn | G06K 19/077 | 235/487 |
| 2010/0039232 A1* | 2/2010 | Chang | G06K 19/07749 | 340/10.1 |
| 2010/0159953 A1* | 6/2010 | Aubert | G06K 19/07749 | 455/456.2 |
| 2010/0164726 A1* | 7/2010 | Tada | G06K 19/07749 | 340/572.7 |
| 2010/0181379 A1* | 7/2010 | Okegawa | G06K 19/07749 | 235/492 |
| 2010/0328171 A1* | 12/2010 | Mak | H01Q 1/42 | 343/720 |
| 2011/0084888 A1* | 4/2011 | Nishioka | G06K 19/07783 | 343/728 |
| 2011/0114734 A1* | 5/2011 | Tiedmann | G06K 19/02 | 235/492 |
| 2011/0133904 A1* | 6/2011 | Warther | G06K 19/04 | 340/10.5 |
| 2011/0147467 A1* | 6/2011 | Choi | H01Q 9/24 | 235/492 |
| 2011/0241834 A1* | 10/2011 | McAllister | G06K 19/07749 | 340/10.1 |
| 2011/0253792 A1* | 10/2011 | Tuttle | G06K 19/0723 | 235/492 |
| 2011/0284641 A1* | 11/2011 | Yang | H01Q 7/00 | 235/492 |
| 2012/0019363 A1* | 1/2012 | Fein | G06K 19/07767 | 340/10.1 |
| 2012/0206239 A1* | 8/2012 | Ikemoto | G06K 7/10346 | 340/10.1 |
| 2012/0235870 A1* | 9/2012 | Forster | H01Q 13/10 | 29/601 |
| 2014/0071006 A1* | 3/2014 | Chan | H01Q 21/28 | 343/730 |
| 2014/0173951 A1* | 6/2014 | Shimizu | G09F 3/0288 | 40/6 |
| 2014/0209690 A1* | 7/2014 | Teng | G06K 19/027 | 235/492 |
| 2014/0252095 A1* | 9/2014 | Kikin | H01Q 7/00 | 235/492 |
| 2014/0263655 A1* | 9/2014 | Forster | H01Q 1/2225 | 235/488 |

(56) References Cited

U.S. PATENT DOCUMENTS

| | | | |
|---|---|---|---|
| 2014/0263659 A1* | 9/2014 | Kervinen | G06K 19/07798 235/488 |
| 2014/0291405 A1* | 10/2014 | Harkes | G06K 19/0716 235/492 |
| 2015/0097040 A1* | 4/2015 | Rampetzreiter | G06K 19/07794 235/492 |
| 2015/0129666 A1* | 5/2015 | Butler | H04L 67/1097 235/492 |
| 2016/0118711 A1* | 4/2016 | Finn | G06K 19/07794 343/867 |
| 2016/0155041 A1* | 6/2016 | Ozaki | H01Q 1/2208 235/488 |
| 2017/0110796 A1* | 4/2017 | Rokhsaz | H01Q 1/2216 |
| 2017/0161601 A1* | 6/2017 | Sevaux | G09F 3/10 |
| 2017/0344864 A1* | 11/2017 | Forster | G06K 19/07786 |
| 2018/0248248 A1* | 8/2018 | Vleurinck | H01Q 1/2225 |
| 2019/0087705 A1* | 3/2019 | Bourque | G06K 19/07762 |
| 2019/0244066 A1* | 8/2019 | Mak | G06K 19/07786 |
| 2019/0244072 A1* | 8/2019 | Forster | G06K 19/07749 |
| 2019/0266467 A1* | 8/2019 | Kato | G06K 19/0772 |
| 2020/0050916 A1* | 2/2020 | Forster | G06K 19/0775 |
| 2020/0175349 A1* | 6/2020 | Mak | H01Q 1/2225 |
| 2020/0249109 A1* | 8/2020 | Singleton | G01L 11/002 |
| 2020/0285930 A1* | 9/2020 | Buhler | G06K 19/07758 |
| 2021/0083391 A1* | 3/2021 | Ueki | H01Q 9/26 |
| 2021/0166100 A1* | 6/2021 | Bühler | H04B 5/0068 |
| 2021/0319276 A1* | 10/2021 | Haensgen | G06K 19/025 |
| 2021/0367325 A1* | 11/2021 | Kato | H01Q 9/24 |
| 2022/0147788 A1* | 5/2022 | Knight | H01Q 1/2283 |

FOREIGN PATENT DOCUMENTS

| | | | | |
|---|---|---|---|---|
| JP | 2005131889 A | * | 5/2005 | |
| JP | 2006148462 A | * | 6/2006 | |
| JP | 2012217042 A | * | 11/2012 | H01Q 1/38 |
| WO | WO-2009034767 A1 | * | 3/2009 | G06K 19/07749 |

* cited by examiner

RADIO FREQUENCY COMMUNICATION DEVICE AND A METHOD FOR USING THEREOF

TECHNICAL FIELD

The present invention relates generally to a radio frequency communication device and a method for using thereof and more particularly, although not exclusively, relates to a radio frequency communication device having a conductive loop being electrically connected to an integrated circuit arrangement and a pair of opposing elongated conductors extending away from the conductive loop.

BACKGROUND

On average, there are 93,000 daily flights originating from about 9,000 airports around the world. At any given time, there are between 8,000 and 13,000 planes in the air around the globe. There is no sign of a decline in passenger or flight numbers either, where flying in developing markets such as China, India, the Middle East and Africa is rising sharply.

Checked luggage is a multibillion-dollar business for airlines. However, baggage are lost or delayed on a daily basis in air travel. Despite all the investment by the airport authorities and fewer checked bags, the rate of mishandled baggage tracked by the Transportation Department is still around 3.22 of every 1,000 passengers in the United State.

SUMMARY OF THE INVENTION

To solve or reduce at least some of the above problems, the present invention discloses a radio frequency communication device comprises a conductive loop non-contact reader with a resilient antenna arranged to communicate with tags when the resilient antenna is engaged to the user.

In accordance with a first aspect of the present invention, there is provided a radio frequency communication device comprising: a conductive loop being electrically connected to an integrated circuit arrangement; and a pair of opposing elongated conductors extending away from the conductive loop.

In one embodiment of the first aspect, the pair of opposing elongated conductors is disposed adjacent to the conductive loop.

In one embodiment of the first aspect, the pair of opposing elongated conductors is conductively separated from the conductive loop.

In one embodiment of the first aspect, the pair of opposing elongated conductors is capacitatively separated from the conductive loop.

In one embodiment of the first aspect, the pair of opposing elongated conductors is electrically connected together by a bridge portion having a pair of lateral extensions that extending from the bridge portion to each of the pair of opposing elongated conductors.

In one embodiment of the first aspect, the bridge portion is proximate to the conductive loop.

In one embodiment of the first aspect, the bridge portion is separated from the conductive loop by an approximately 2 mm non-conductive gap.

In one embodiment of the first aspect, the conductive loop and the pair of opposing elongated conductors are disposed onto an inlay.

In one embodiment of the first aspect, the inlay is arranged to be folded in use for optimal communication performance.

In one embodiment of the first aspect, the inlay is arranged to be folded in use by folding the conductive loop over the pair of opposing elongated conductors such that a joint is created between the conductive loop and the pair of opposing elongated conducts at the pair of lateral extensions.

In one embodiment of the first aspect, when folded for use, the conductive loop is disposed within a substrate with the pair of opposing elongated conducts extending along an edge of the substrate.

In one embodiment of the first aspect, the substrate is a flexible tag.

In one embodiment of the first aspect, one end of the opposing elongated conductors extends approximately 40-60 mm away from the integrated circuit arrangement.

In one embodiment of the first aspect, another end of the opposing elongated conductor extends approximately 90 to 110 mm away from the integrated circuit arrangement.

In one embodiment of the first aspect, the pair of opposing elongated conductors is approximately 0.2 mm wide.

In one embodiment of the first aspect, the conductive loop is approximately 5 mm by 20 mm.

In one embodiment of the first aspect, the integrated circuit arrangement is a RFID chip or an RFID Integrated circuit.

In one embodiment of the first aspect, one of the elongated conductors is shorter than the other opposing elongated conductor.

In one embodiment of the first aspect, the elongated conductors have the same length.

In accordance with a second aspect of the present invention, there is provided a plurality of radio frequency communication tags separated by at least one perforated edge, wherein each of the tags include a radio frequency communication device in accordance with any one of the embodiments.

In accordance with a third aspect of the present invention, there is provided a method for using a radio frequency communication device in accordance with any one of the embodiments, comprising the steps of: bonding the device to a substrate; and folding the conductive loop over the pair of opposing elongated conductors such that the conductive loop is disposed within a substrate with the pair of opposing elongated conductors extending along an edge of the substrate.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
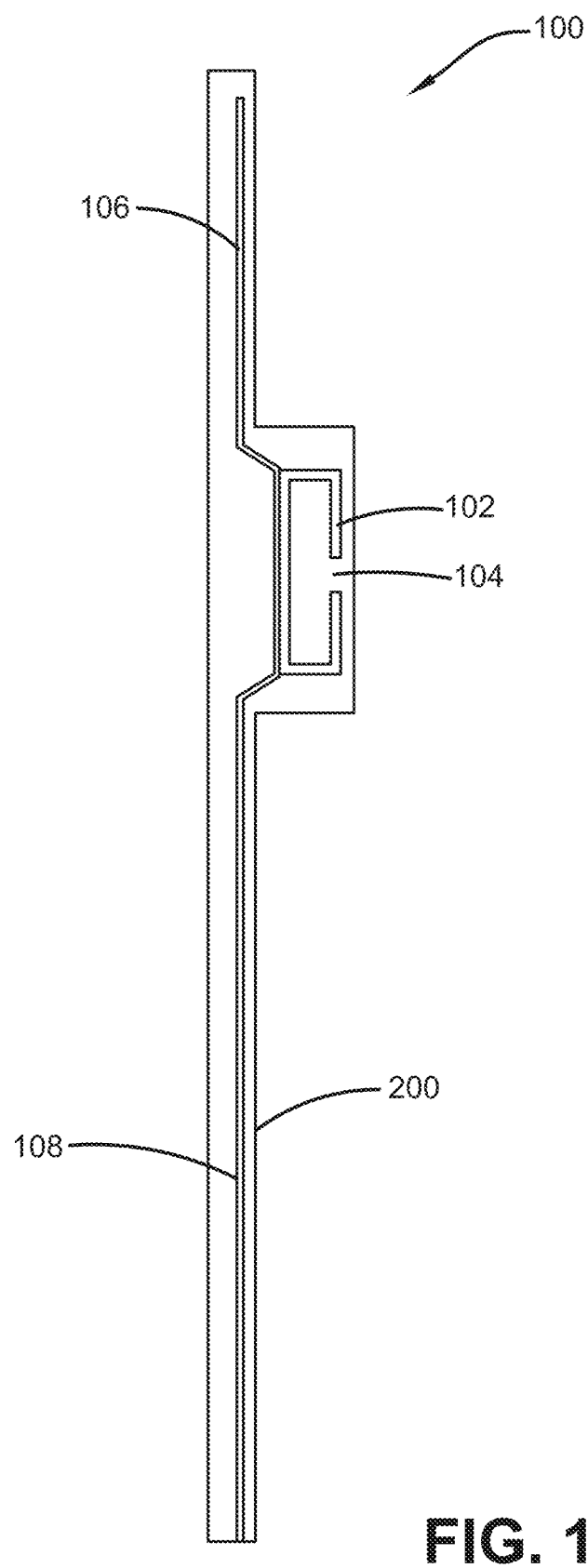
FIG. 1 shows a schematic view of the tag in accordance with one embodiment of the present invention.

With reference to FIG. 1, there is provided a radio frequency communication device 100 comprising a conductive loop 102 being electrically connected to an integrated circuit arrangement 104; and a pair of opposing elongated conductors 106, 108 extending away from the conductive loop 102.

In this embodiment, the radio frequency communication device 100 is provided with a loop 102 and a pair of thin conductive wires 106, 108. The pair of thin conductive wires 106, 108 forms a pair of opposing elongated conductors 106, 108. The pair of opposing elongated conductors 106, 108 is being disposed adjacent to the conductive loop 102, such that these elongated conductors 106, 108 are conductively separated or capacitatively separated from the conductive loop 102.

Figure 2:
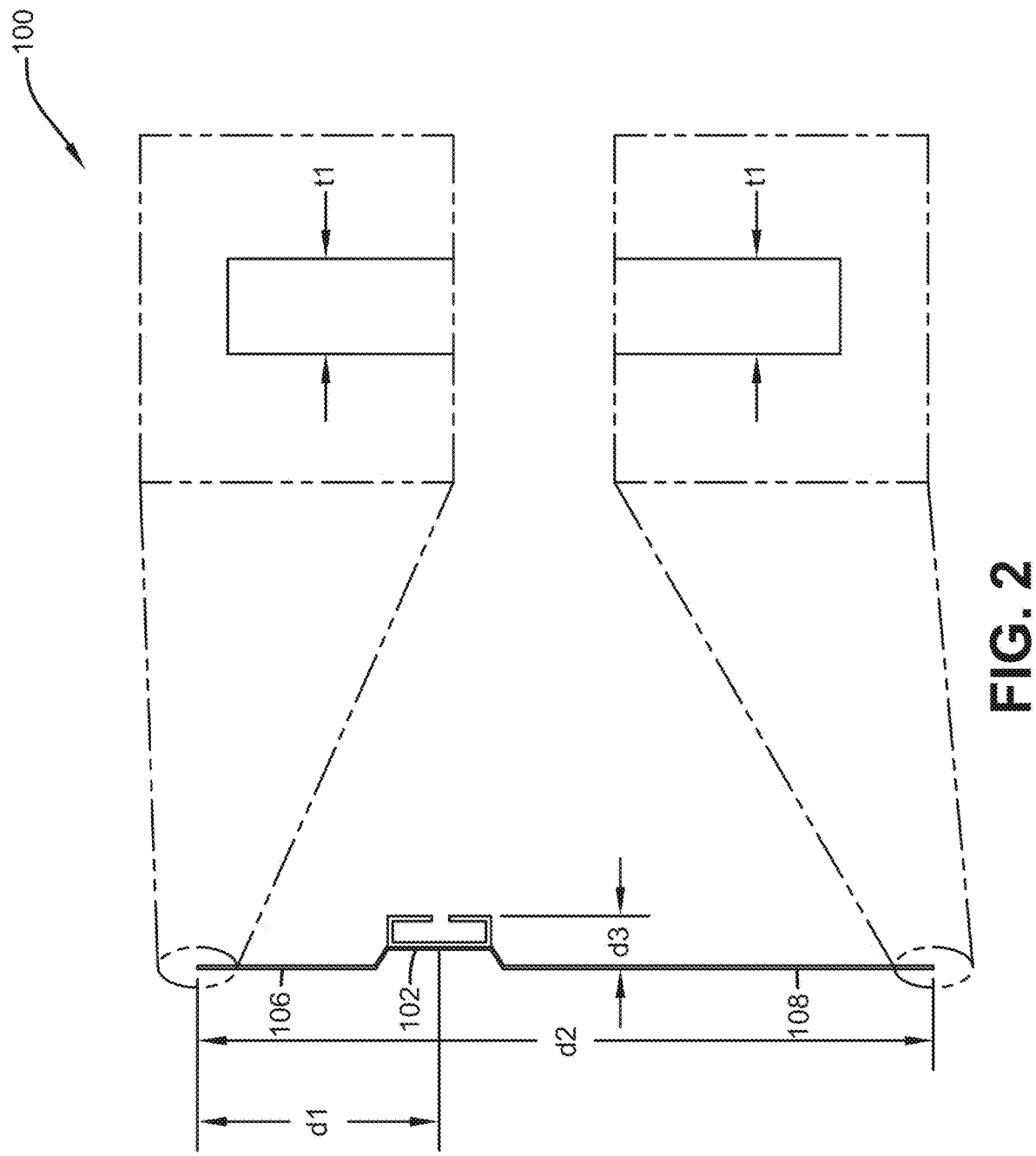
FIG. 2 shows an example arrangement of the tag in accordance with one embodiment of the present invention.

With reference to FIG. 2, the pair of thin conductive wires 106, 108 may be extended in two opposite directions from the upper and lower corners of the loop 102, thereby forming a first elongated conductor 106 and a second elongated conductor 108. Preferably, the first elongated conductor 106 and the second elongated conductor 108 may have unequal lengths.

In one embodiment, the elongated conductors 106 may be shorter than the other opposing elongated conductor 108. For example, the upper end of the first elongated conductor 106 may extend approximately 40-60 mm away from the integrated circuit arrangement 104, while the lower end of the opposing second elongated conductor 108 may extend approximately 90 to 110 mm away from the integrated circuit arrangement 104. Advantageously, the difference in lengths between the two opposing elongated conductors 106, 108 may allow the tag 100 to better conform with medium that is fixed to. However, it may be appreciated by person skilled in the art that the elongated conductors 106, 108 may also have the same length. Preferably, the the radio frequency communication device 100 may be T-shaped with uneven or even arm length.

In one embodiment, the trace width of the elongated conductors 106, 108 should be as thin as possible. In one example, the elongated conductors, i.e. thickness t1 may be approximately 0.2 mm wide. In one example, the vertical distance d1 between the upper end of the first elongated conductor 106 and the middle point of the length of the loop 102 may be 47.5 mm. In one example, the vertical distance d2 between the upper end of the first elongated conductor 106 and the lower end of the second elongated conductor 108 may be 145 mm. In one example, the farthest lateral distance d3 between the loop 102 and the elongated conductors 106, 108 may be 8.6 mm.

Figure 3:
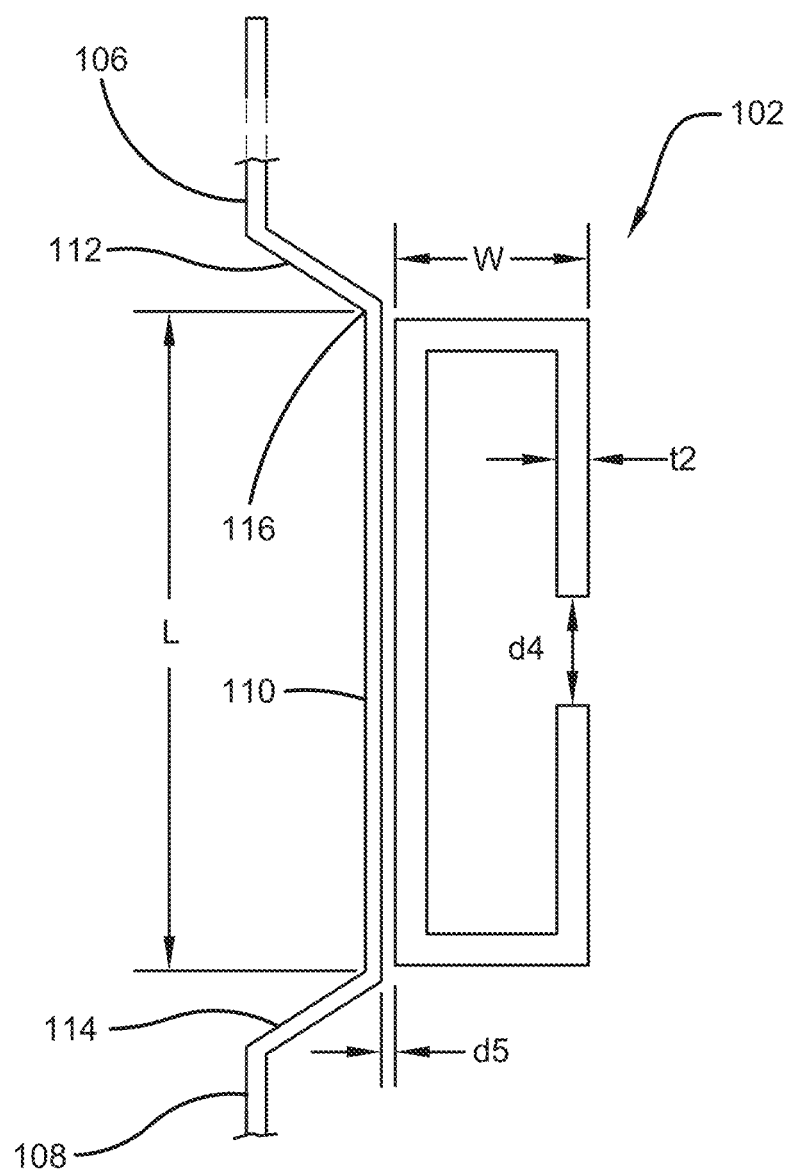
FIG. 3 is a partial view of FIG. 2 showing the arrangement of the loop in accordance with one embodiment of the present invention.

With reference to FIG. 3, the loop 102 may be a substantially rectangular frame with a trace width. The thickness t2 of the trace width is relatively thicker than that of the elongated conductors 106, 108. There is also provided a small gap d4 of loop 102 such that the loop 102 would form an open loop and receive an integrated circuit arrangement 104. For example, the integrated circuit arrangement 104 may be a RFID chip or an RFID Integrated Circuit 104 such as an Alien H3 chip. In one example, t2 may be 0.8 mm and d4 may be 2 mm. In one example, the outer dimensions of the loop 102 may be approximately 5 mm (L) by 20 mm (W).

In this embodiment, the pair of opposing elongated conductors 106, 108 is electrically connected together by a bridge portion 110 having a pair of lateral extensions 112, 114 that extending from the bridge portion 110 to each of the pair of opposing elongated conductors 106, 108. Preferably, the bridge portion 110 is proximate to the conductive loop 102 and being separated from the conductive loop 102 by a small non-conductive gap d5. Preferably, the non-conductive gap may be approximately 0.2 mm.

Figure 4:
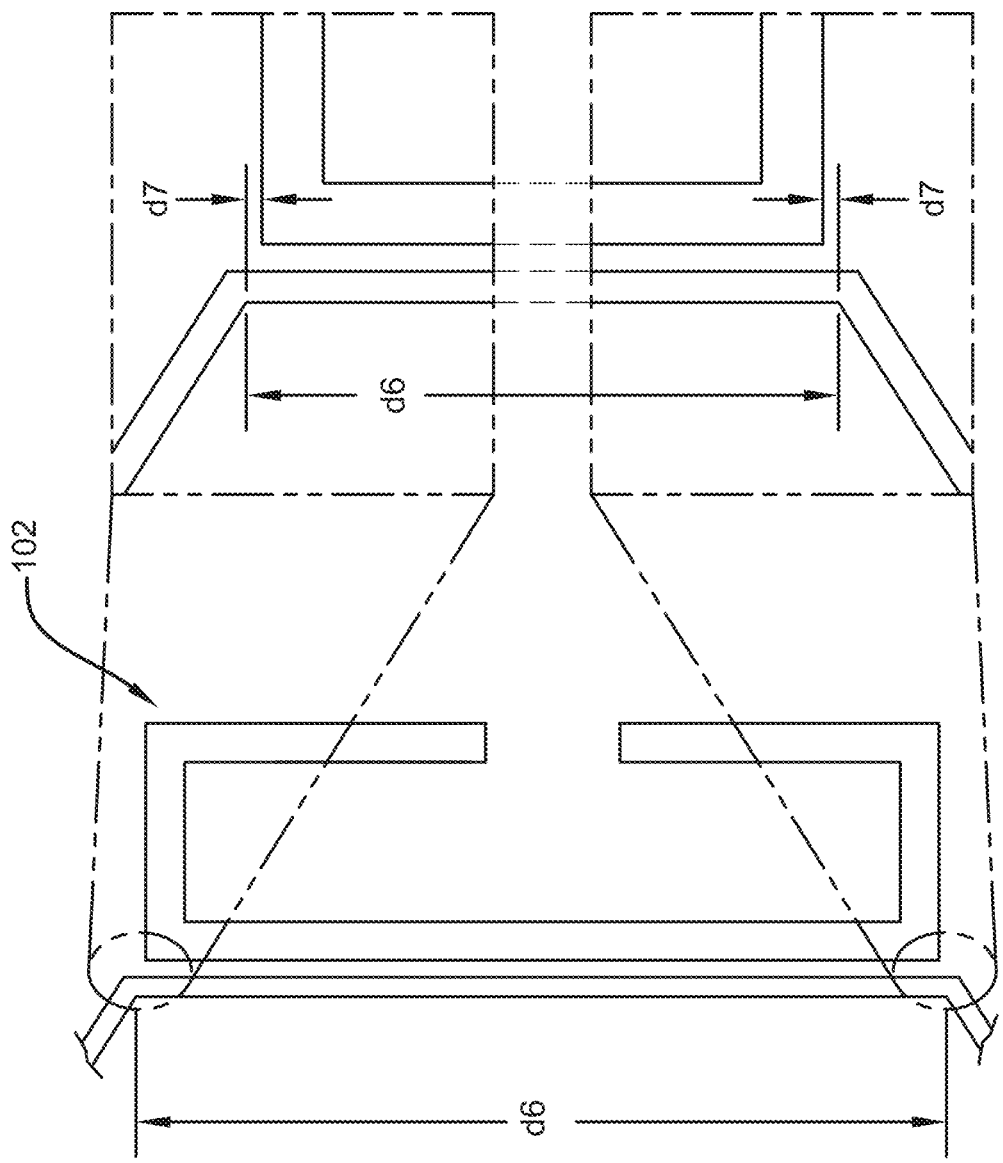
FIG. 4 is a partial view of FIG. 2 showing the middle section of the tag in accordance with one embodiment of the present invention.

With reference to FIG. 4, the bridge portion 110 may be parallel to the conductive loop 102 and extended along its length in the two opposing directions, until it has reached the two ends of the loop 102. The bridge portion 110 is then further extended for a small distance d7, e.g. 0.2 mm.

Figure 5:
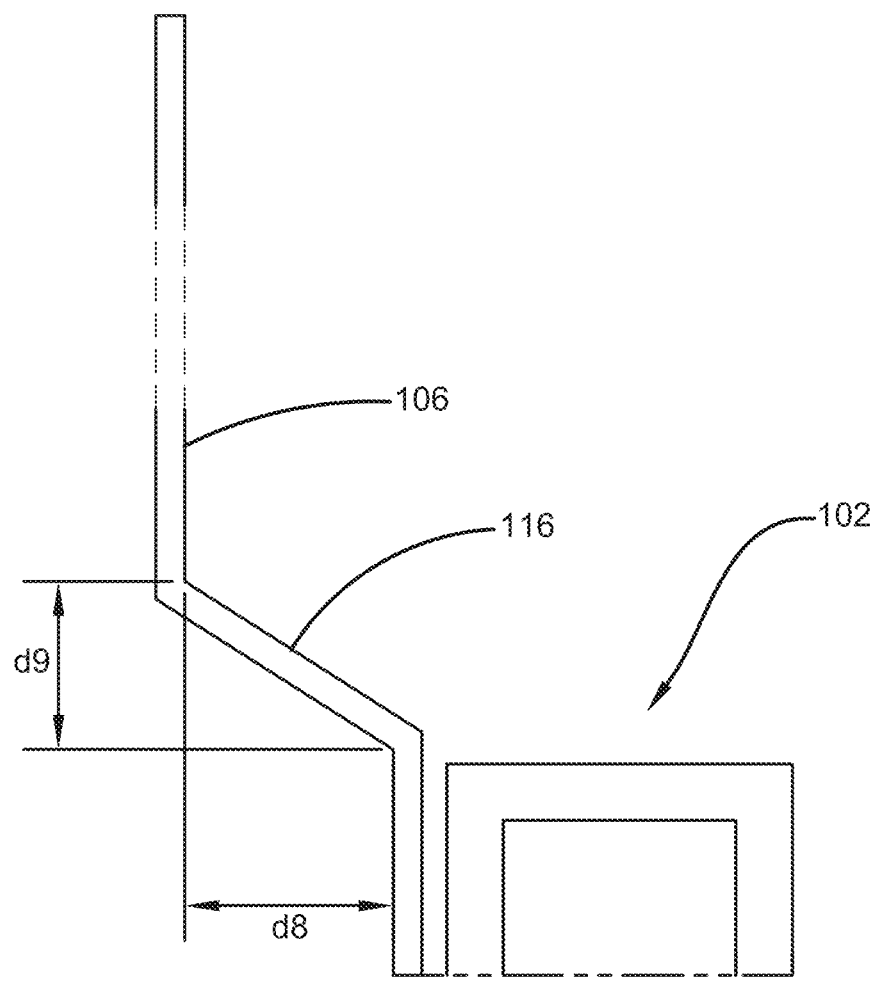
FIG. 5 is a partial view of FIG. 2 showing the upper section of the tag in accordance with one embodiment of the present invention.
Figure 6:
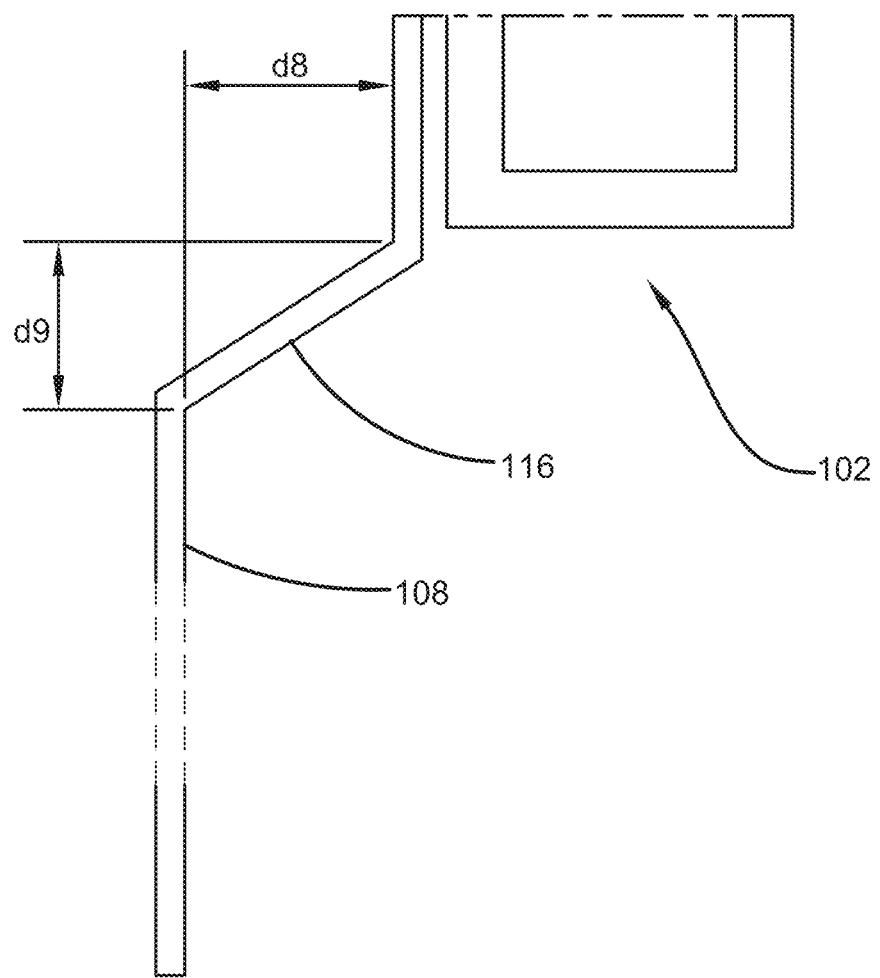
FIG. 6 is a partial view of FIG. 2 showing the lower section of the tag in accordance with one embodiment of the present invention.

With reference to FIGS. 5 to 6, the extended bridge portion 110 may be transited to the two elongated conductors 106, 108 and form a pair of joints 116 therebetween by bending away from the upper and lower corners of the loop 102 at an angle. In one example, the bridge portion 110 may be extended with a lateral distance d8 of 3 mm and a vertical distance d9 of 2 mm.

Figure 7:
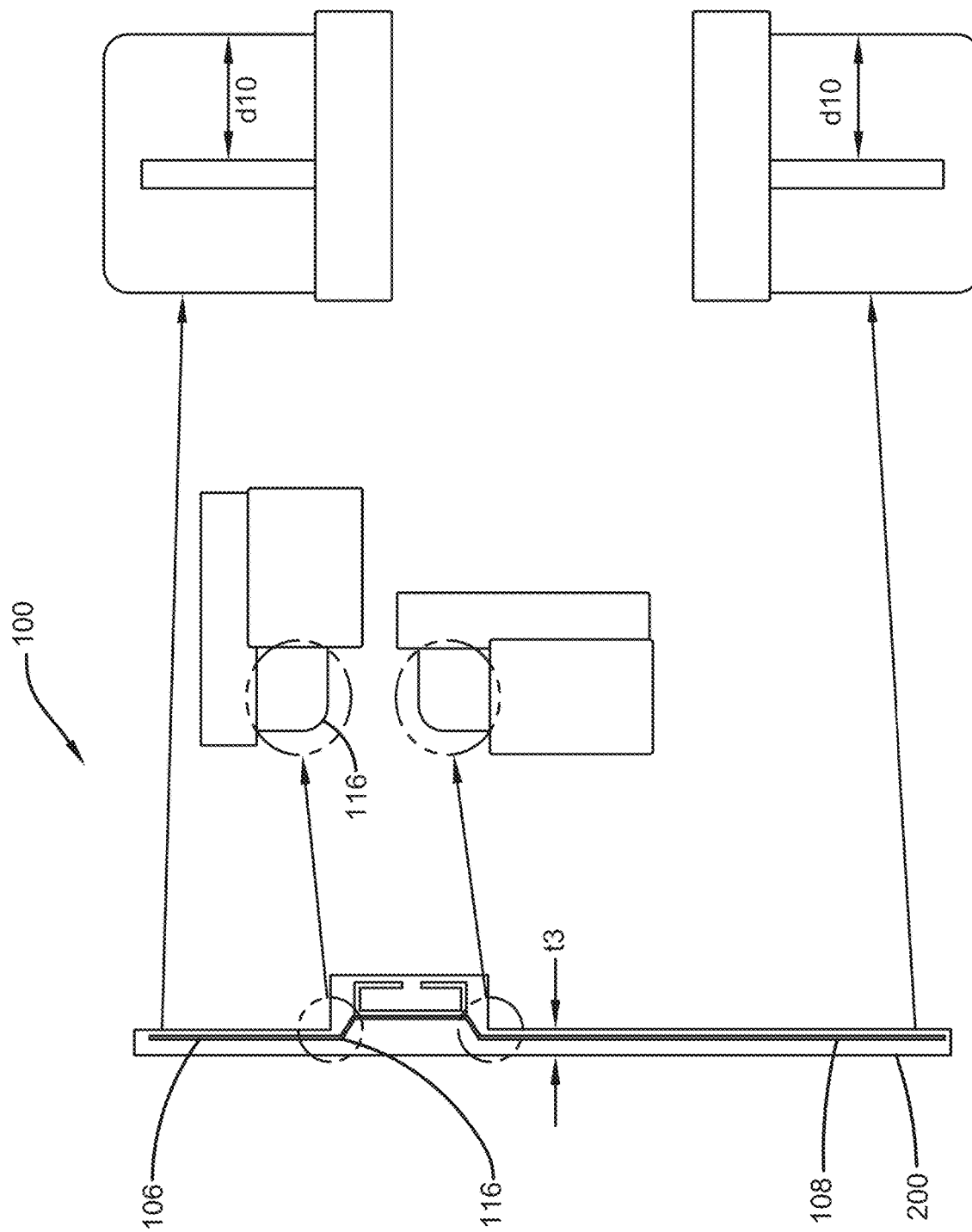
FIG. 7 shows a schematic view of the tag with round corner transition between the bridge portion and the conductors in accordance with one embodiment of the present invention.

With reference to FIG. 7, the radio frequency communication device 100 is further provided with an inlay 200 e.g. a wet inlay or a transparent inlay, wherein the conductive loop 102 and the pair of opposing elongated conductors 106, 108 are disposed onto the inlay 200. The inlay 200 may surround the elongated conductors 106, 108 with a thickness t3 that is greater than the thickness t1 of the elongated conductors 106, 108. The elongated conductors 106, 108 may be received therein to bisect the diameter of the inlay 200 approximately. Preferably, the thickness t3 should be as thin as possible. In one example, t3 may be 3 mm and d10 may be 1.5 mm.

Advantageously, the inlay 200 is arranged to be folded in use for optimal communication performance and additionally for minimizing footprint or inconspicuous design. During use, the inlay 200 is arranged to be folded by folding the conductive loop 102 over the pair of opposing elongated conductors 106, 108 along the pair of joints 116 therebetween at the pair of lateral extensions. Preferably, the pair of joints 116 may be in round corners such that it may be received within the inlay 200.

Figure 8:
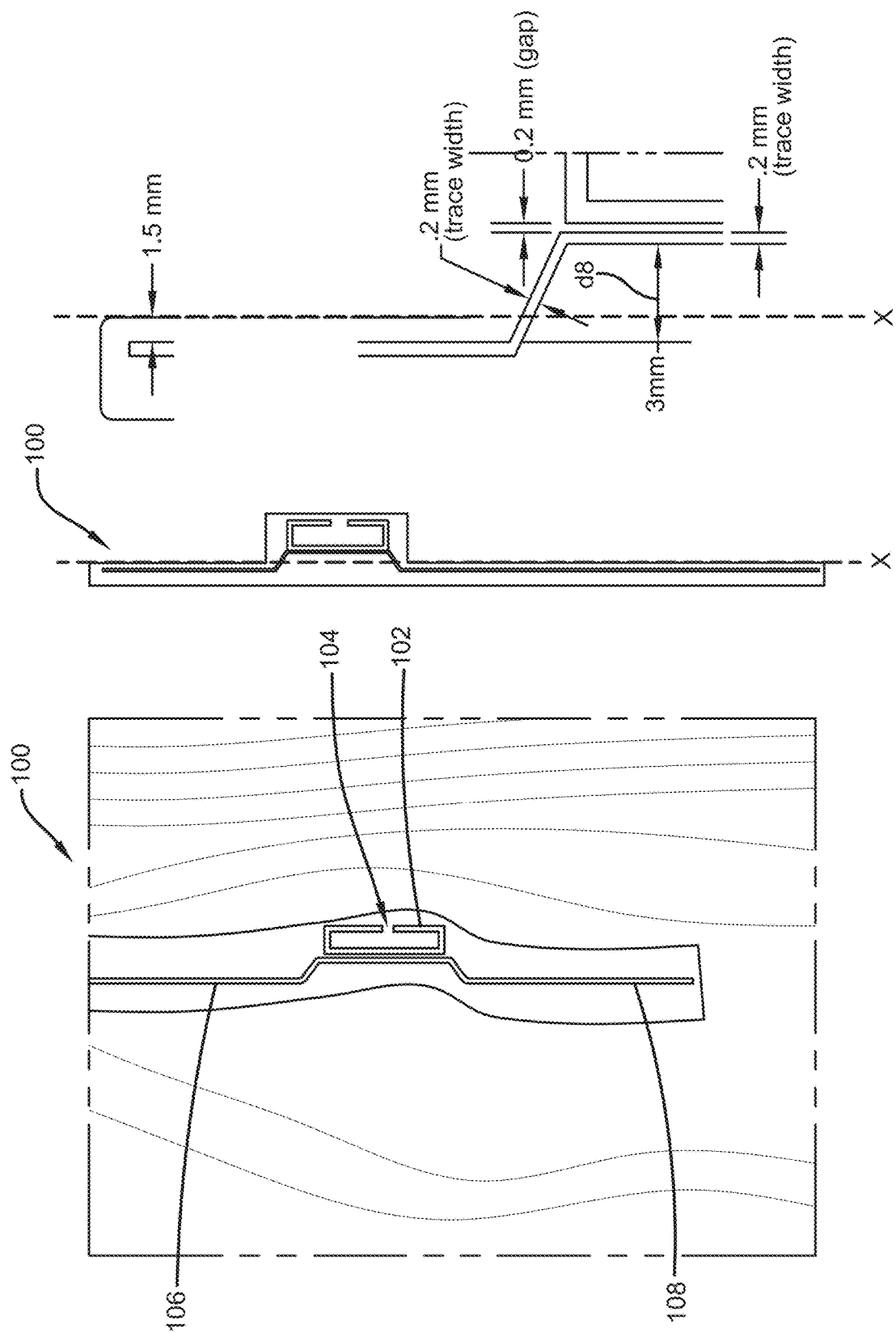
FIG. 8a shows a tag in accordance with one embodiment of the present invention.
FIG. 8b shows a schematic view of the tag in FIG. 8a in accordance with one embodiment of the present invention.
FIG. 8c is a partial view of FIG. 8b showing the upper end and the middle section of the tag in accordance with one embodiment of the present invention.
Figure 9:
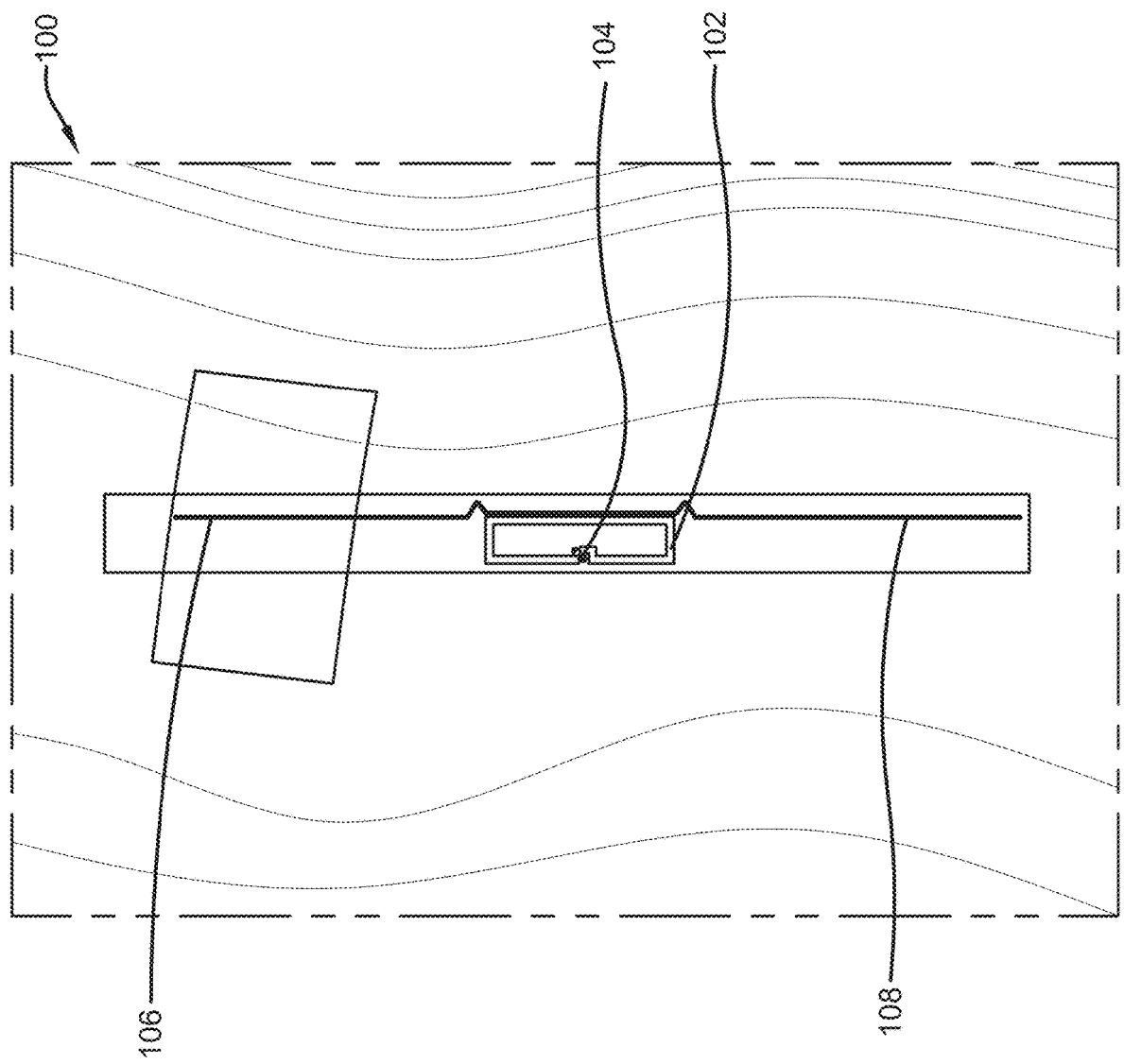
FIG. 9 shows the tag of FIG. 8a with a folded portion in accordance with one embodiment of the present invention.

With reference to FIGS. 8a to 8c, the radio frequency communication device 100 e.g. a tag 100 may be arranged in a foldable form for embedding with a substrate 300, for example a flexible tag 300 or any other non-metallic mediums, thereby bonding the tag 100 to the substrate 300. To achieve the bonding, the pair of joints 116 of the conductive loop 102 may be folded over the pair of opposing elongated conductors 106, 108 along the folding line X, such that the conductive loop 102 may be disposed within the substrate 300 with the pair of opposing elongated conductors 106, 108 extending along an edge of the substrate 300. In one example, the tag 100 may be folded at the midsection of the joint 116, such that the axis of the folded joints 116 and the upper and lower portion of the tag 100 that surround the elongated conductors 106, 108 may substantially form a straight line as shown in FIG. 9.

Figure 10:
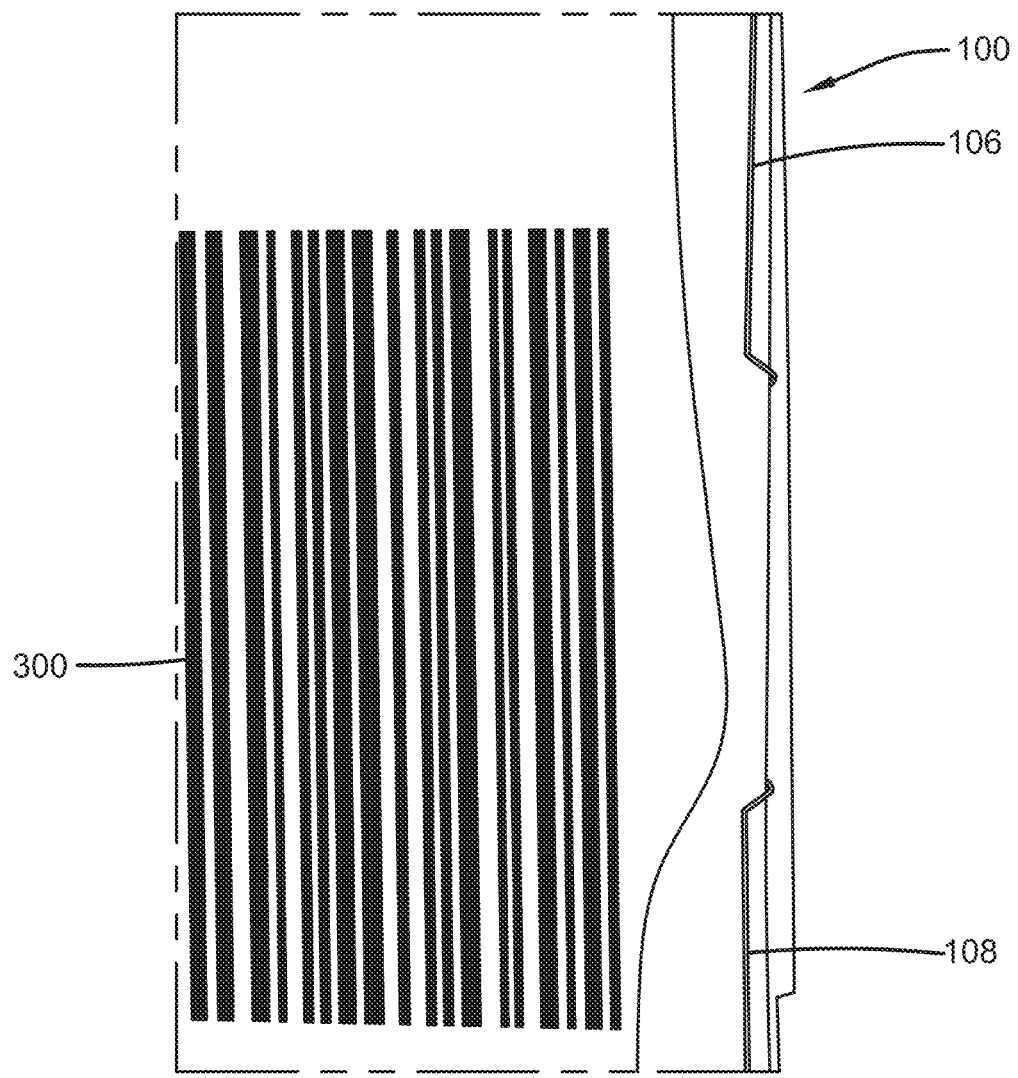
FIG. 10 shows a front view of the tag attached to an airport baggage handling label in accordance with one embodiment of the present invention.
Figure 11:
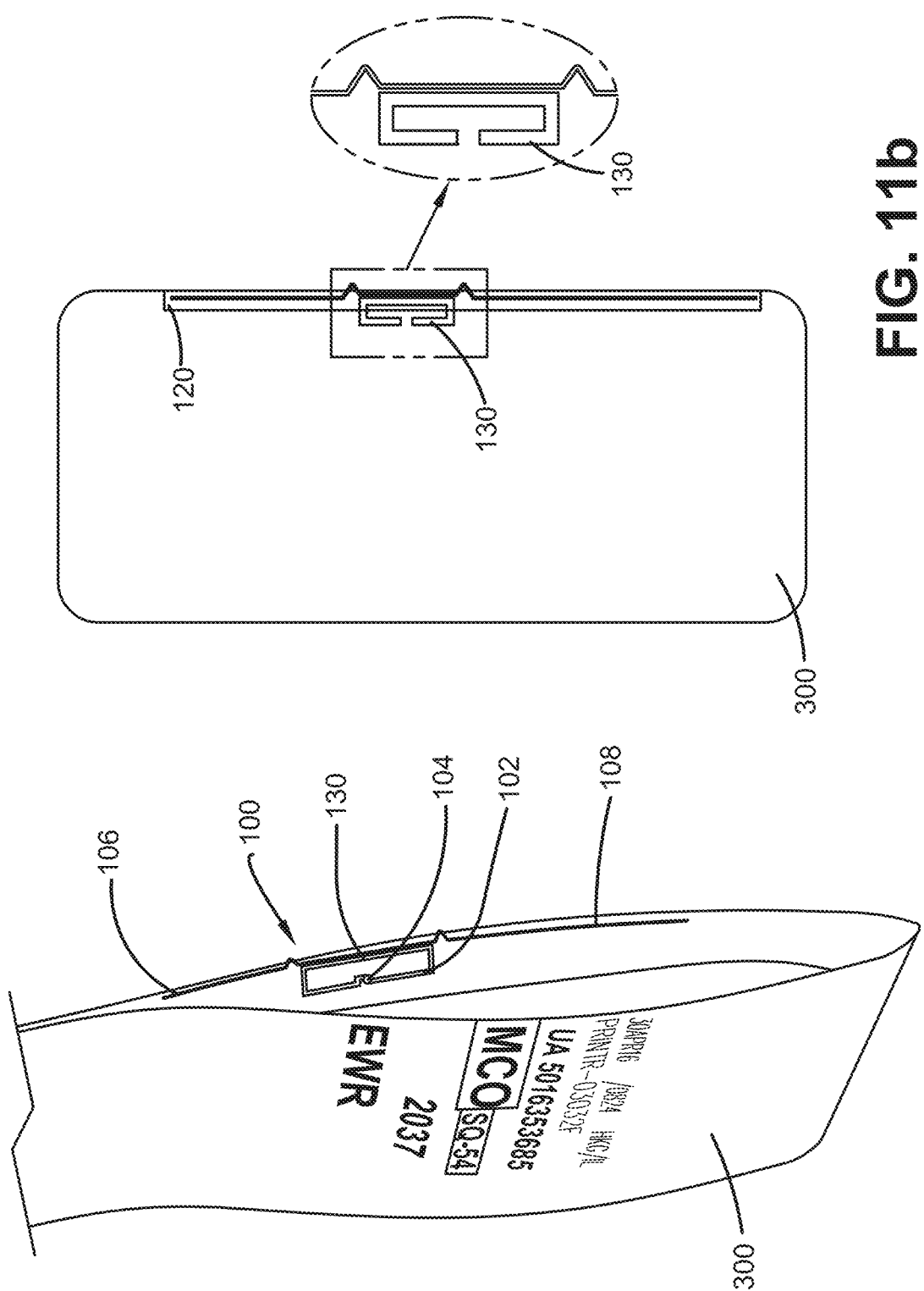
FIG. 11a shows a rear view of the tag embedded to an airport baggage handling label in accordance with one embodiment of the present invention.
FIG. 11b is a schematic view of the tag in FIG. 11a embedded to an airport baggage handling label in accordance with one embodiment of the present invention.
Figure 12:
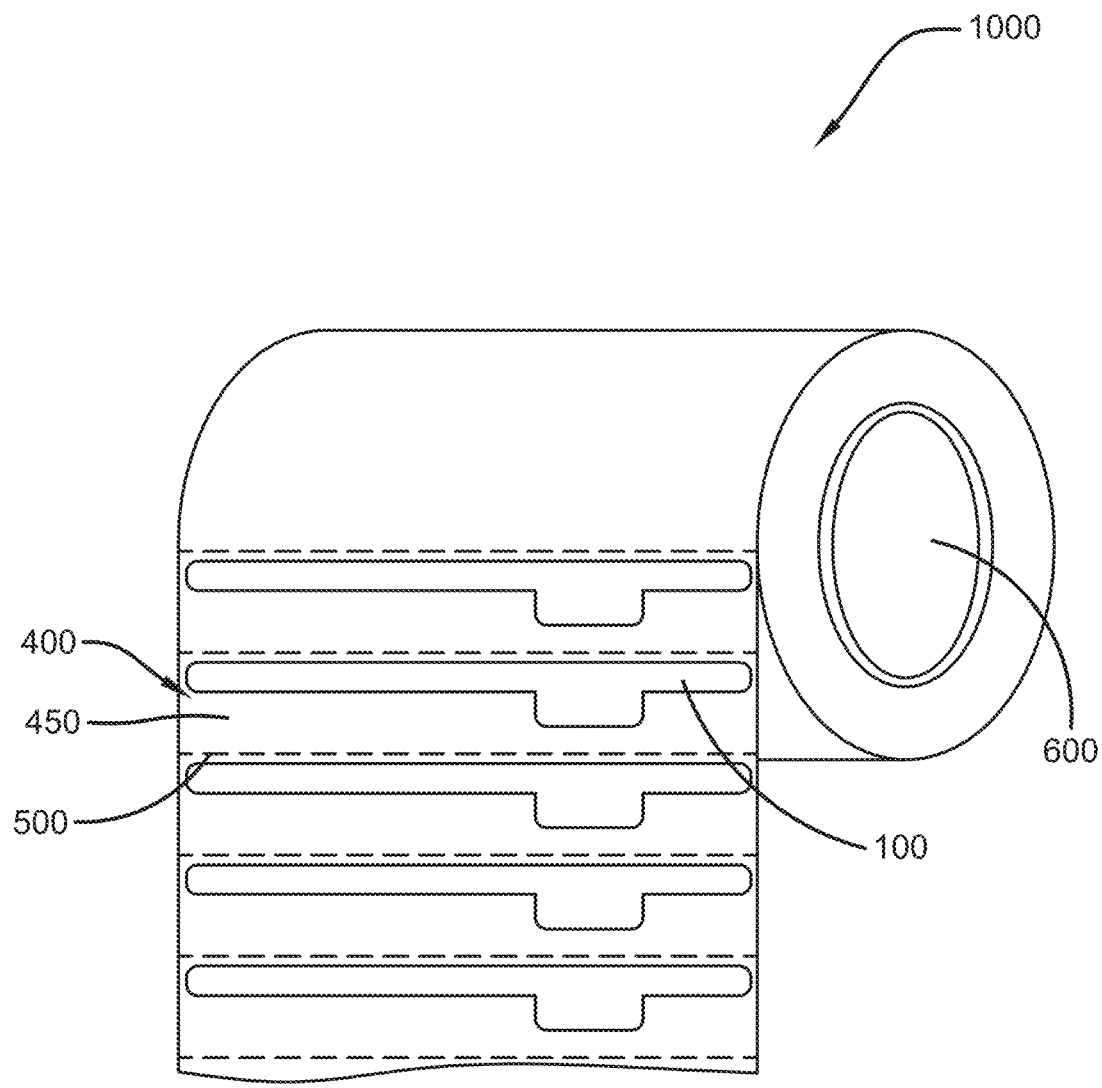
FIG. 12 shows a plurality of tags in accordance with another embodiment of the present invention.

With reference to FIG. 10, the folded tag 100) may be aligned along one edge of the substrate 300, such that one edge of the substrate 300 may be placed within the slot formed between the two layers 120, 130 of the tag 100. With reference to FIGS. 11a to 11b, the top layer 120 of the folded tag 100 is placed on top of the substrate 300, and the bottom layer 130 of the folded tag 100 is placed underneath of the first layer of the substrate 300). Advantageously, the substrate 300 may serve as an inconspicuous tag that may be secured to items, while the loop portion 102 may remain hidden behind the substrate 300.

In one alternative embodiment, the extended bridge portion 110 may be transited vertically to the two elongated conductors 106, 108 without any bending and thereby forms a pair of joints 116 therebetween. Preferably, the two elongated conductors 106, 108 and the pair of joints 116 may form a straight line. Advantageously, the tag 100 may be arranged in a foldable form by folding the conductive loop 102 over the pair of opposing elongated conductors 106, 108 along a folding line Y (not shown) that bisects the thickness d5, such that at least a portion of the conductive loop 102 may overlap the two elongated conductors 106, 108 and thus being disposed within the substrate 300.

In a further example embodiment, a plurality of radio frequency communication tags 400, e.g. each batch of 5000 pcs, may be provided together with white labels 450 for shipping arrangement. Every tag 400 includes a radio frequency communication device 100 in any one of the aforementioned embodiments, and each of the plurality of radio frequency communication tags 400 may be separated by at least one perforated edge 500. Advantageously, the perforated edge 500 facilitates the user to tear the tag 400 off one by one.

To attach the radio frequency communication tag 400 to an object, the user first tear off the white label 450 with the radio frequency communication tag 400 from the tag-roll 600, and then remove the white label 450 from the radio frequency communication tag 400. The user then proceed with the steps as depicted in FIGS. 8a to 11b to arrange the tag 400 in a foldable form for embedding with a substrate 300.

In one example embodiment, the user may be a staff at the airport check-in counter. During check-in, the passenger hands over their baggage to the staff for baggage storage. The staff first prints the bag tag 300 with the passenger information, and tear off the radio frequency communication tag 400 from the tag-roll 600 along the perforated edge 500. Upon the removal of the white label 450 from the radio frequency communication tag 400, the pair of joints 116 of the radio frequency communication tag 400 may be folded over the pair of opposing elongated conductors 106, 108 along the folding line, such that the the radio frequency communication tag 400 is embedded as part of the bag tag 300. The combined baggage rag 300 is then tagged about the handle of the baggage, and the baggage would be loaded to the flight via the conveyor belt. With the live location information provided by the radio frequency communication tag 400, the passenger may reclaim his baggage more efficiently once he has landed the destination.

It will be appreciated by persons skilled in the art that although the embodiments comprising the radio frequency communication device 100 are applied to baggage tag, these embodiments may be applied in any other applications such as securely fixing the radio frequency communication device 100 to an edge of a windshield or headlamp with minor modifications and without departing from the concept of the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A radio frequency communication device comprising: an inlay; a non-metallic substrate
   an integrated circuit arrangement;
   a conductive loop having a length being electrically connected to the integrated circuit arrangement;
   a pair of opposing elongated conductors disposed adjacent to the conductive loop and extending away from the conductive loop in opposite directions; and
   a bridge portion through which the pair of opposing elongated conductors are electrically connected, the bridge portion including a pair of lateral extensions, each extending from the bridge portion to a respective one of the pair of opposing elongated conductors, wherein the pair of lateral extensions is arranged to bend away from the conductive loop with respect to the length of the conductive loop;
   wherein the bridge portion is separated from the conductive loop by a non-conductive gap, and the pair of lateral extensions defines a folding line extending along the length of the non-conductive gap and joining at the respective midsection of each of the pair of lateral extensions such that in use the inlay is folded about the folding line, creating a joint at each of the midsections of the pair of lateral extensions; and
   wherein the inlay is bonded to the substrate and folded about the folding line, such that, when bonded, the conductive loop is disposed on a surface of the substrate and the pair of opposing elongated conductors are disposed on an opposite surface of the substrate and along an edge of the substrate.

2. The radio frequency communication device in accordance with claim 1, wherein the pair of opposing elongated conductors is conductively separated from the conductive loop.

3. The radio frequency communication device in accordance with claim 1, wherein the bridge portion is separated from the conductive loop by the non-conductive gap of approximately 2 mm.

4. The radio frequency communication device in accordance with claim 1, wherein in use the inlay is arranged to be folded for optimal communication performance.

5. The radio frequency communication device in accordance with claim 1, wherein the substrate is a flexible tag.

6. The radio frequency communication device in accordance with claim 5, wherein one end of the opposing elongated conductors extends approximately 40-60 mm away from the integrated circuit arrangement.

7. The radio frequency communication device in accordance with claim 6, wherein another end of the opposing elongated conductor extends approximately 90 to 110 mm away from the integrated circuit arrangement.

8. The radio frequency communication device in accordance with claims 5, wherein the pair of opposing elongated conductors is approximately 0.2 mm wide.

9. The radio frequency communication device in accordance with claim 1, wherein the conductive loop is approximately 5 mm by 20 mm.

10. The radio frequency communication device in accordance with claim 1, wherein the integrated circuit arrangement is a RFID circuit.

11. The radio frequency communication device in accordance with claim 1, wherein one of the elongated conductors is shorter than the other opposing elongated conductor.

12. The radio frequency communication device in accordance with claim 1, wherein the elongated conductors have the same length.

13. A plurality of radio frequency communication tags separated by at least one perforated edge, wherein each of the tags include a radio frequency communication device in accordance with claim 1.

14. A method for using a radio frequency communication device including
   an inlay; a non-metallic substrate
      an integrated circuit arrangement;
         a conductive loop having a length being electrically connected to the integrated circuit arrangement;
      a pair of opposing elongated conductors disposed adjacent to the conductive loop and extending away from the conductive loop in opposite directions; and
      a bridge portion through which the pair of opposing elongated conductors are electrically connected, the bridge portion including a pair of lateral extensions each extending from the bridge portion to a respective one of the pair of opposing elongated conductors, wherein the pair of lateral extensions is arranged to bend away from the conductive loop respect to the length of the conductive loop;
   wherein the bridge portion is separated from the conductive loop by a non-conductive gap, and the pair of lateral extensions defines a folding line extending along the length of the non-conductive gap and joining at the respective midsection of each of the pair of lateral extensions such that in use the inlay is folded about the folding line, creating a joint at each of the midsections of the pair of lateral extensions; and
   wherein the inlay is arranged to be bonded to a substrate and folded about the folding line,
the method comprising the steps of:
   bonding the device to a substrate; and
   folding the inlay about the folding line such that the conductive loop is folded to an opposite side of the substrate, such that the conductive loop is disposed on a surface of the substrate and the pair of opposing elongated conductors are disposed on an opposite surface of the substrate and along an edge of the substrate.

\* \* \* \* \*